US011327611B2

United States Patent
Yang (10) Patent No.: US 11,327,611 B2
(45) Date of Patent: May 10, 2022

(54) TOUCH SUBSTRATE, MANUFACTURING AND DRIVING METHOD THEREOF, AND TOUCH DISPLAY DEVICE

(71) Applicants: BOE Technology Group Co., Ltd., Beijing (CN); Hefei BOE Optoelectronics Technology Co., Ltd., Anhui (CN)

(72) Inventor: Qing Yang, Beijing (CN)

(73) Assignees: BOE Technology Group Co., Ltd., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 935 days.

(21) Appl. No.: 15/779,233

(22) PCT Filed: Sep. 28, 2017

(86) PCT No.: PCT/CN2017/103959
§ 371 (c)(1),
(2) Date: May 25, 2018

(87) PCT Pub. No.: WO2018/196278
PCT Pub. Date: Nov. 1, 2018

(65) Prior Publication Data
US 2021/0165521 A1  Jun. 3, 2021

(30) Foreign Application Priority Data
Apr. 28, 2017  (CN) .......................... 201710296329.0

(51) Int. Cl.
*G06F 3/041*  (2006.01)
*G06F 3/044*  (2006.01)

(52) U.S. Cl.
CPC ............ *G06F 3/0443* (2019.05); *G06F 3/044* (2013.01); *G06F 3/0418* (2013.01);
(Continued)

(58) Field of Classification Search
CPC .................. G06F 3/0418; G06F 3/044; G06F 2203/04103; G06F 2203/04105
See application file for complete search history.

(56) References Cited

U.S. PATENT DOCUMENTS 5,510,813 A   4/1996  Makinwa et al.
9,529,485 B2  12/2016 Peng et al.
(Continued)

FOREIGN PATENT DOCUMENTS

CN   101614917 A   12/2009
CN   102709241 A   10/2012
(Continued)

OTHER PUBLICATIONS

Jan. 16, 2018—(WO) International Search Report and Written Opinion Application PCT/CN2017/103959 with English Translation.
(Continued)

*Primary Examiner* — Hong Zhou
(74) *Attorney, Agent, or Firm* — Banner & Witcoff, Ltd.

(57) ABSTRACT

A touch substrate, a manufacturing and driving method thereof and a touch display device are provided. The touch substrate includes: a base substrate and a force sensor being located on the base substrate and including at least one force sensing unit, the force sensing unit including a plurality of extension parts and at least one connection part, the plurality of extension parts extending along a first direction X, the plurality of extension parts being sequentially connected by the at least one connection part. The touch substrate can increase the change in resistance caused by the touch force so as to facilitate detection of the change in touch force by the detection chip.

17 Claims, 10 Drawing Sheets

(52) U.S. Cl.
CPC .......... *G06F 3/0446* (2019.05); *G06F 3/0448* (2019.05); *G06F 2203/04103* (2013.01); *G06F 2203/04105* (2013.01)

(56) References Cited

U.S. PATENT DOCUMENTS

| | | | |
|---|---|---|---|
| 2009/0189866 | A1 | 7/2009 | Haffenden et al. |
| 2010/0128002 | A1 | 5/2010 | Stacy et al. |
| 2013/0076646 | A1* | 3/2013 | Krah ............... G06F 3/0446 345/173 |
| 2013/0149818 | A1 | 6/2013 | Jung et al. |
| 2013/0169903 | A1 | 7/2013 | Xiao et al. |
| 2013/0342501 | A1 | 12/2013 | Molne et al. |
| 2014/0061645 | A1 | 3/2014 | Li et al. |
| 2014/0225863 | A1* | 8/2014 | Tanaka ............. G06F 3/04164 345/174 |
| 2015/0002452 | A1 | 1/2015 | Klinghult |
| 2016/0188066 | A1 | 6/2016 | Shahparnia |
| 2016/0342257 | A1* | 11/2016 | Watazu ............. G06F 3/0446 |
| 2016/0370909 | A1 | 12/2016 | Wang et al. |
| 2017/0115781 | A1* | 4/2017 | Zeng ............... H01L 27/3276 |
| 2017/0277294 | A1* | 9/2017 | Wang ............... G06F 3/0445 |
| 2018/0113542 | A1* | 4/2018 | Cao ................ G06F 3/0412 |

FOREIGN PATENT DOCUMENTS

| | | |
|---|---|---|
| CN | 102832170 A | 12/2012 |
| CN | 205334402 U | 6/2016 |
| CN | 106325582 A | 1/2017 |
| CN | 106898578 A | 6/2017 |
| EP | 0640936 A1 | 3/1995 |
| EP | 2748695 B1 | 1/2019 |
| JP | H06332607 A | 12/1994 |
| JP | 2015041160 A | 3/2015 |

OTHER PUBLICATIONS

Jan. 15, 2021—(EP) Partial Supplementary European Search Report Appn 17897205.5.
Feb. 3, 2020—(CN) First Office Action Appn 201710296329.0 with English Translation.
Apr. 28, 2021—EP—Extended European Search Report Appn. 17897205.5.
Apr. 5, 2021—IN—First Examination Report Appn 201947034611.
Aug. 3, 2021—(JP) First Office Action Appn 2019-547154 with English Translation.

* cited by examiner

TOUCH SUBSTRATE, MANUFACTURING AND DRIVING METHOD THEREOF, AND TOUCH DISPLAY DEVICE

CROSS-REFERENCE TO RELATED APPLICATIONS

The application is a U.S. National Phase Entry of International Application No. PCT/CN2017/103959 filed on Sep. 28, 2017, designating the United States of America and claiming priority to Chinese Patent Application No. 201710296329.0, filed on Apr. 28, 2017. The present application claims priority to and the benefit of the above-identified applications and the above-identified applications are incorporated by reference herein in their entirety.

TECHNICAL FIELD

At least one embodiment of the present disclosure relates to a touch substrate, a manufacturing method thereof and a touch display device.

BACKGROUND

The current 3D touch (force touch) brought by iPhone is more and more widely applied, realizes more touch functions by detecting a magnitude of a touch force, and meanwhile, outputs different levels of force feedbacks by determining a magnitude of a touch force, gives consumers a better touch experience. It can be predicted that 3D touch will be more and more widely applied on consumer electronics.

SUMMARY

At least one embodiment of the present disclosure relates to a touch substrate, a manufacturing and driving method thereof, and a touch display device.

At least one embodiment of the present disclosure provides a touch substrate, comprising:
 a base substrate; and
 a force sensor, located on the base substrate and comprising at least one force sensing unit, the force sensing unit comprising a plurality of extension parts and at least one connection part, the plurality of extension parts extending along a first direction, the plurality of extension parts being sequentially connected by the at least one connection part.

At least one embodiment of the present disclosure further provides a manufacturing method of a touch substrate, comprising:
 forming a force sensor on a base substrate, the force sensor comprising at least one force sensing unit, the force sensing unit comprising a plurality of extension parts and at least one connection part, the plurality of extension parts extending along a first direction, the plurality of extension parts being sequentially connected by the at least one connection part.

At least one embodiment of the present disclosure provides a driving method of any one of the touch substrates as mentioned above, comprising:
 providing a driving signal to the force sensor; and
 outputting a force signal according to a change in voltage difference on two ends of the force sensing unit to determine a magnitude of a touch force, the change in voltage difference on two ends of the force sensing unit caused by a change in resistance value of the force sensing unit under an action of an external force.

At least one embodiment of the present disclosure further provides a touch display device, comprising any one of the touch substrates as mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to limit to a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The implementation of the force touch function of iPhone requires an additional force sensor, a driver IC thereof and a peripheral circuit. Thus, not only the cost is increased but also the thickness is increased, which is against the will of consumers.

Figure 1:
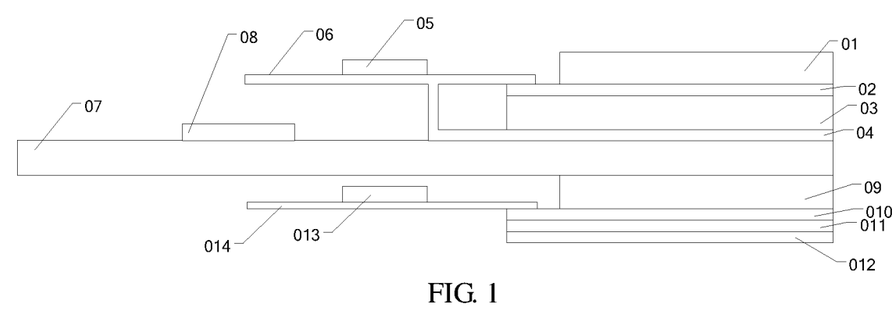
FIG. 1 is a schematic diagram of a touch display device.

As illustrated in FIG. 1, a touch display device includes an array substrate 07 and an opposing substrate 03 which is cell-assembled with the array substrate. A liquid crystal cell is formed by the array substrate 07 and the opposing substrate 03, and liquid crystals (not illustrated in the figure) can be filled into the liquid crystal cell. A force sensor 010 is located on a force touch carrier material 011, and a protective layer 012 is located on a side of the force touch carrier material 011 away from the force sensor 010. The force sensor 010 is connected with a first detection chip 013 by a first flexible printed circuit (FPC). A touch sensor includes a first sensor 04 and a second sensor 02. One of the first sensor 04 and the second sensor 02 is a touch driving sensor (Tx) and the other of the first sensor 04 and the second sensor 02 is a touch sensing sensor (Rx). The first sensor 04 and the second sensor 02 are connected with a second detection chip 05 by a second FPC 06. The touch display device further includes an upper polarizer 01 and a lower polarizer 09. The force touch carrier material 011 can include a base substrate made of glass material or polyethylene terephthalate (PET). A driver IC 08 can also be located on the array substrate 07.

In the touch display device as illustrated in FIG. 1, the touch sensor and the force sensor of the touch display device are separately designed, so the thickness of the touch display device can be increased and the assembly and the manufacturing process can also be more complex.

The base substrate is deformed under an action of a touch force, so the resistance of the force sensor would change. Generally, the change in resistance caused by deformation due to an external force is small.

Figure 2:
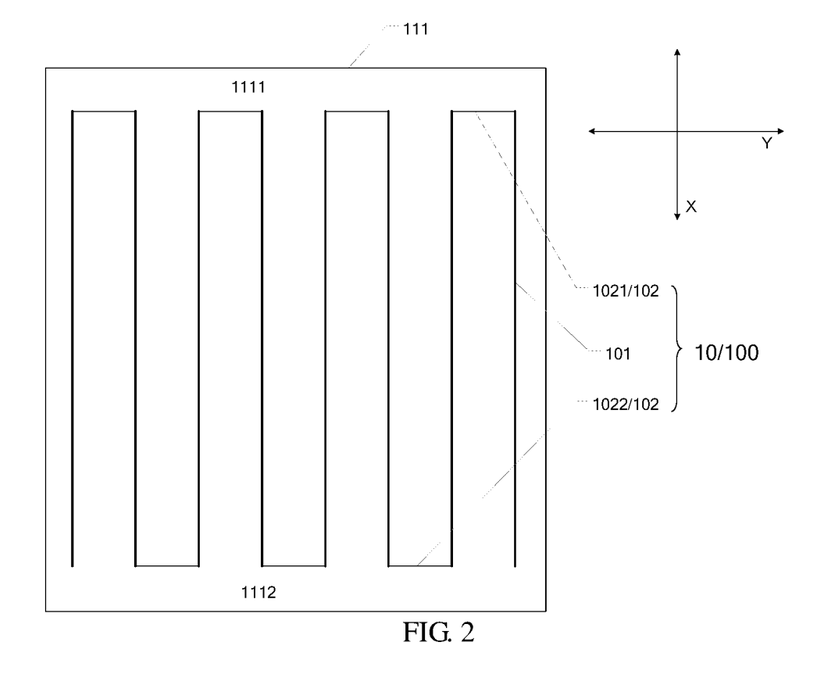
FIG. 2 is a schematic diagram of a force sensor of a touch substrate provided by an embodiment of the present disclosure.

At least one embodiment of the present disclosure provides a touch substrate, which, as illustrated in FIG. 2, includes:

a base substrate 111, a material of the base substrate, for example, including glass material or PET material; and a force sensor 10, located on the base substrate 111 and including at least one force sensing unit 100, the force sensing unit 100 including a plurality of extension parts 101 and at least one connection part 102, the plurality of extension parts 101 extending along a first direction X, the plurality of extension parts 101 being sequentially connected by the at least one connection part 102. At least one includes one or more. A plurality includes at least two.

In the touch substrate provided by at least one embodiment of the present disclosure, as the force sensing unit 100 includes the plurality of extension parts 101 extending along the first direction X and the plurality of extension parts 101 are sequentially connected through one or more connection parts 102, the number of the extension parts 101 of the force sensing unit in a unit area can be increased, and the change in resistance caused by the touch force can be increased to facilitate detection of a change in touch force by a detection chip.

In the touch substrate provided by an embodiment of the present disclosure, as illustrated in FIG. 2, the force sensing unit 100 includes a line-shaped part. For example, the line-shaped part includes a square waveform line-shaped part. The plurality of extension parts 101 extending along the first direction X are connected into a line with a shape of a square waveform by the plurality of connection parts 102. For example, the force sensing unit 100 includes a "z"-shaped part. For example, strip electrodes can be adopted to form the line-shaped part.

For example, two adjacent extension parts 101 are connected with each other by one connection part 102, and n extension parts 101 can be sequentially connected by n−1 connection parts 102.

Description is given in FIG. 2 by taking the case that the force sensor 10 includes one force sensing unit 100 as an example. The force sensor 10 can also include a plurality of force sensing units 100. When the force sensor 10 includes the plurality of force sensing units 100, the effect and the accuracy of the force touch can be improved.

According to the touch substrate provided by an embodiment of the present disclosure, as illustrated in FIG. 2, the connection parts 102 adjacent to each other in a second direction Y are located on different sides (different ends) 1111 and 1112 of the same surface of the base substrate 111, and respectively connected with two ends of the same extension part 101. The second direction Y is perpendicular to the first direction X.

As illustrated in FIG. 2, the connection part 102 includes a first connection part 1021 located on a first side 1111 of the base substrate 111 and a second connection part 1022 located on a second side 1112 of the base substrate 111, and the first side 1111 and the second side 1112 are respectively located on both sides of the base substrate 111. For example, the first side 1111 can be close to a side of the base substrate 111; the second side 1112 can be close to the other side of the base substrate 111; and the two sides are opposite to each other. The first connection part 1021 and the second connection part 1022 adjacent to each other in the second direction Y are respectively connected with two ends of the same extension part 101.

Figure 3:
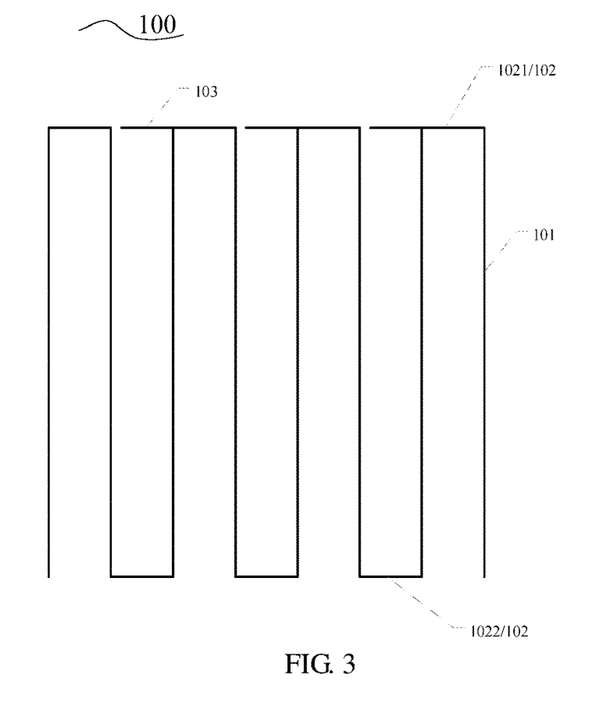
FIG. 3 is a schematic diagram of a force sensor of a touch substrate provided by another embodiment of the present disclosure.
Figure 4:
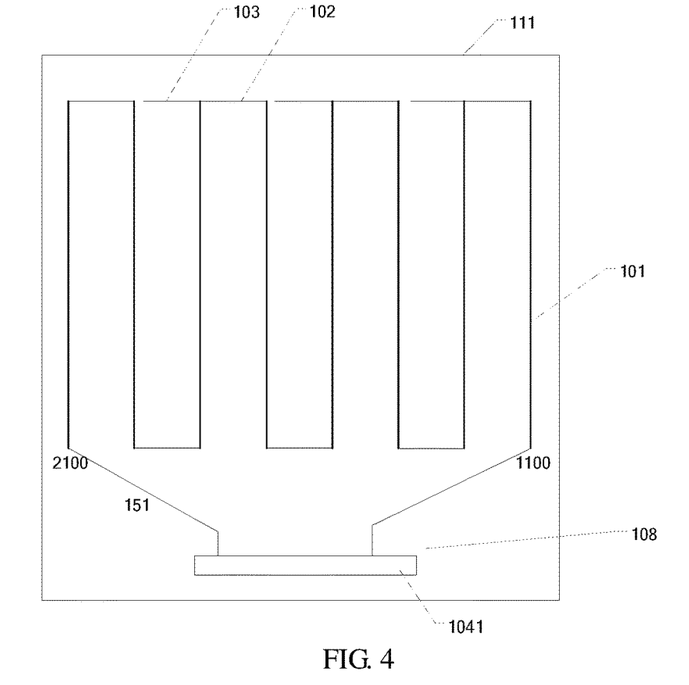
FIG. 4 is a schematic diagram illustrating a force sensor and a first detection chip which are connected with each other in a touch substrate provided by an embodiment of the present disclosure.

According to the touch substrate provided by an embodiment of the present disclosure, as illustrated in FIGS. 3 and 4, the force sensing unit 100 further includes a protection part 103. The protection part 103 is electrically connected with one of two adjacent connection parts 102 located on the same side of the base substrate 111, and insulated from the other of the two adjacent connection parts 102 located on the same side of the base substrate 111. The protection part 103 is located on a side of the force sensing unit away from a bonding area 108. Thus, when the force sensor and other structures (for example, formed in the same layer with Tx and Rx) are formed in the same layer, the design of a small opening on the first side of the base substrate is favorable for the Tx and Rx located internal to be protected by the force sensor. For example, the protection part 103 can be formed in the same layer or different layers with the extension parts 101 and/or the connection parts 102.

According to the touch substrate provided by an embodiment of the present disclosure, as illustrated in FIG. 4, the touch substrate further includes a first detection chip 1041 which is configured to detect a change in resistance value or a change in voltage value of the force sensor 10 so as to detect a magnitude of a touch force. Two ends 1100 and 2100 of each force sensing unit 100 in the force sensor 10 are respectively connected with two ends of the first detection chip 1041 by wires 151. A change in voltage value caused by a change in resistance is detected by the first detection chip 1041, so as to generate a signal of a magnitude of a touch force and provide the signal of the magnitude of the touch force to a system terminal. A change in resistance value of the force sensing unit 100 can result in a change in voltage value of two ends of the force sensing unit, and a magnitude of a touch force can be detected by detecting a change in voltage value caused by a change in resistance value.

Figure 5:
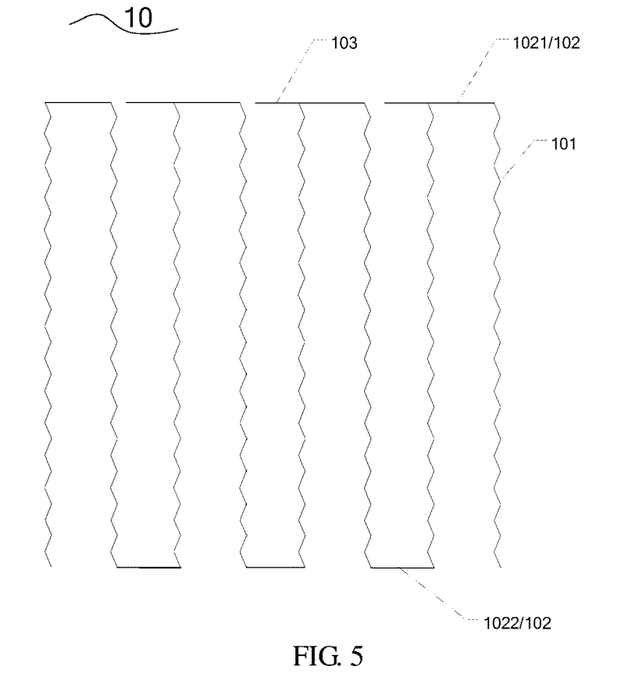
FIG. 5 is a schematic diagram of a force sensor of a touch substrate provided by another embodiment of the present disclosure.
Figure 6:
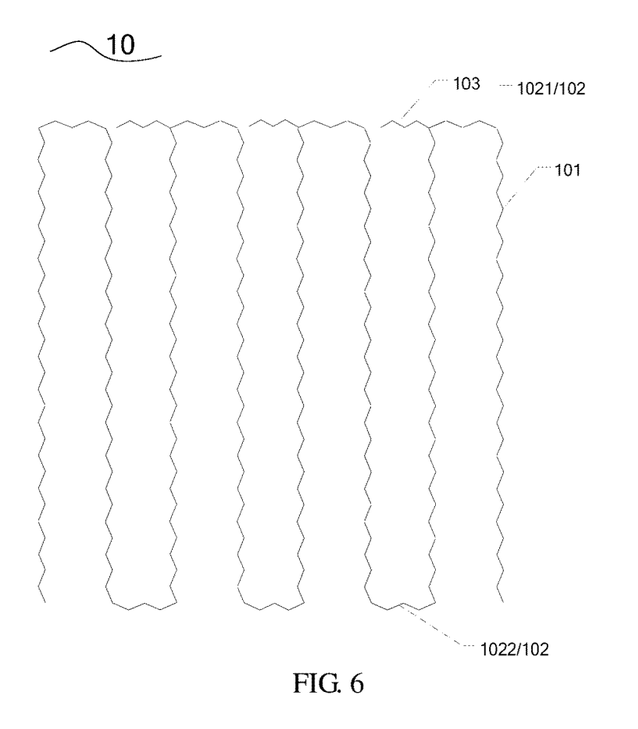
FIG. 6 is a schematic diagram of a force sensor of a touch substrate provided by another embodiment of the present disclosure.

For example, as illustrated in FIG. 5, the extension part 101 can have a zigzag shape, so as to further improve the touch effect and the touch accuracy. For example, as illustrated in FIG. 6, the connection part 102 can also have a zigzag shape, so as to further improve the touch effect and the touch accuracy. For example, in order to improve the blanking effect of the touch substrate, the protection part 103 can also have a zigzag shape.

Figure 7:
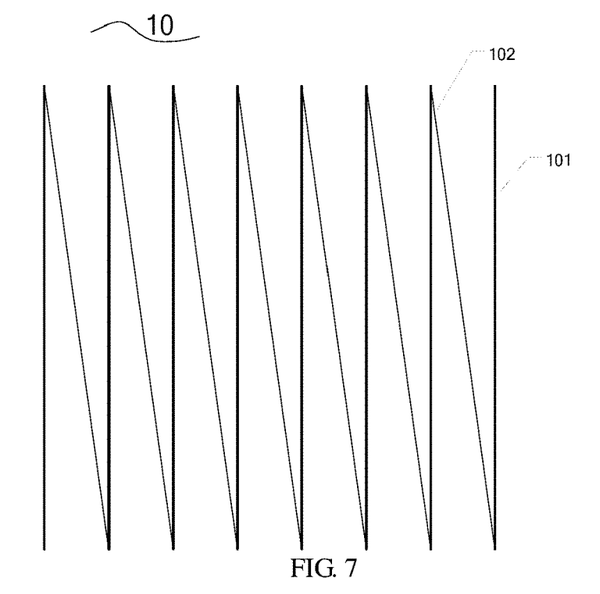
FIG. 7 is a schematic diagram of a force sensor of a touch substrate provided by another embodiment of the present disclosure.

The connection part 102 can also be in other forms. For example, as illustrated in FIG. 7, the connection part 102 can also be connected with ends on different sides of adjacent extension parts 101, so that the plurality of extension parts 101 can be sequentially connected end to end to form one line. For example, the force sensing unit 100 can include a line-shaped part. For example, as illustrated in FIG. 7, the force sensing unit 100 includes a zigzag line-shaped part. The force sensing unit 100 as illustrated in FIG. 7 can further improve the touch accuracy and the touch effect. For example, two ends of the line-shaped part of the force sensing unit 100 are respectively connected with two ends of the first detection chip 1041.

Figure 8:
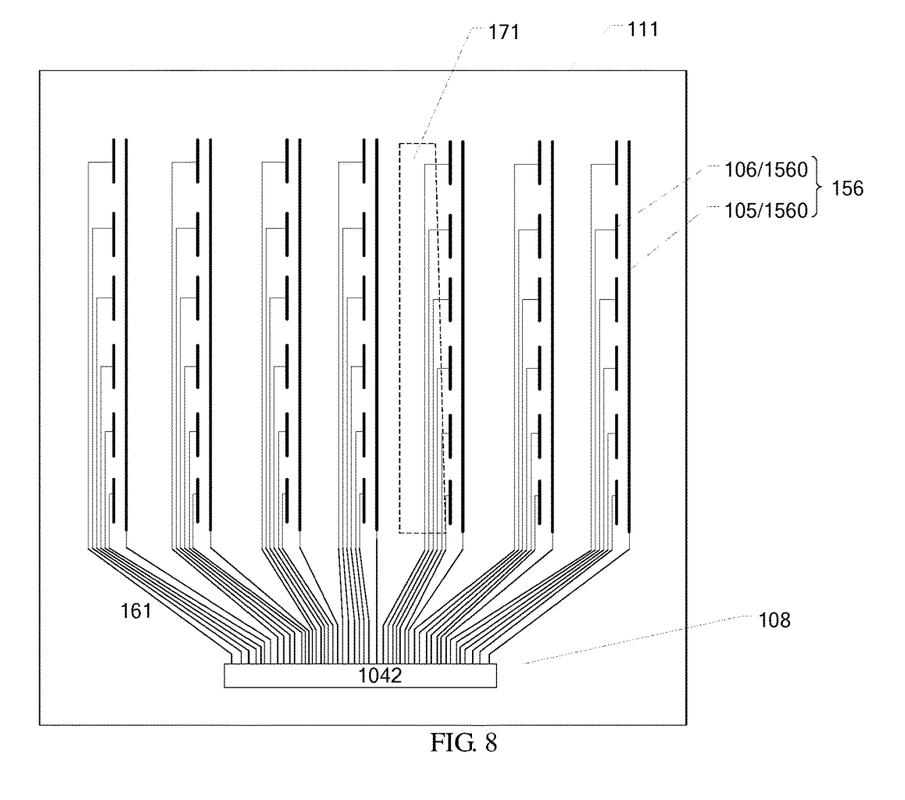
FIG. 8 is a schematic diagram illustrating a touch sensor and a second detection chip connected with the touch sensor in a touch substrate.

As illustrated in FIG. 8, the touch substrate provided by an embodiment of the present disclosure further includes a touch sensor 156. The touch sensor 156 can be configured to detect a pressing (touch) position. The touch sensor 156 is located on the base substrate 111 and includes a plurality of touch sensing units 1560. The plurality of touch sensing units 1560 are connected with a second detection chip 1042 by respective wires 161. The second detection chip 1042 is configured to detect a change in capacitance value of the touch sensor 156, so as to detect a touch position. The touch sensing unit 1560 includes a first touch sensing unit 105 and a second touch sensing unit 106. One of the first touch sensing unit 105 and the second touch sensing unit 106 is a touch driving unit, and the other of the first touch sensing unit 105 and the second touch sensing unit 106 is a touch sensing unit. The touch driving unit can be configured to receive a touch driving signal, and the touch sensing unit can be configured to output a touch sensing signal. Thus, the pressing (touch) position can be detected. For example, each row of second touch sensing units 106 in a horizontal direction can be electrically connected with each other or applied with the same signal, and can be taken as touch driving units (Tx). The first touch sensing units 105 in a vertical direction can be taken as touch sensing units (Rx). For example, the touch driving units are insulated from each other, and the touch sensing units are insulated from each other. As a node of each touch sensor 156 must connect Tx and Rx to a bonding area at the edge by wires respectively from the inside of the touch substrate, the wires will occupy partial visible area, so as to produce a touch blind area 171. The touch blind area 171 can be as illustrated by a dotted box in FIG. 8.

According to the touch substrate provided by an embodiment of the present disclosure, as the force sensor adopts the means of detecting a change in resistance value and does not interfere with the operation of the touch sensor, time-division driving can be not adopted, so the report rate of the touch sensor can be improved. Of course, a time-division driving manner can also be adopted. In the case of scanning of the touch sensor, the force sensor can be grounded (GND attribute).

Figure 9:
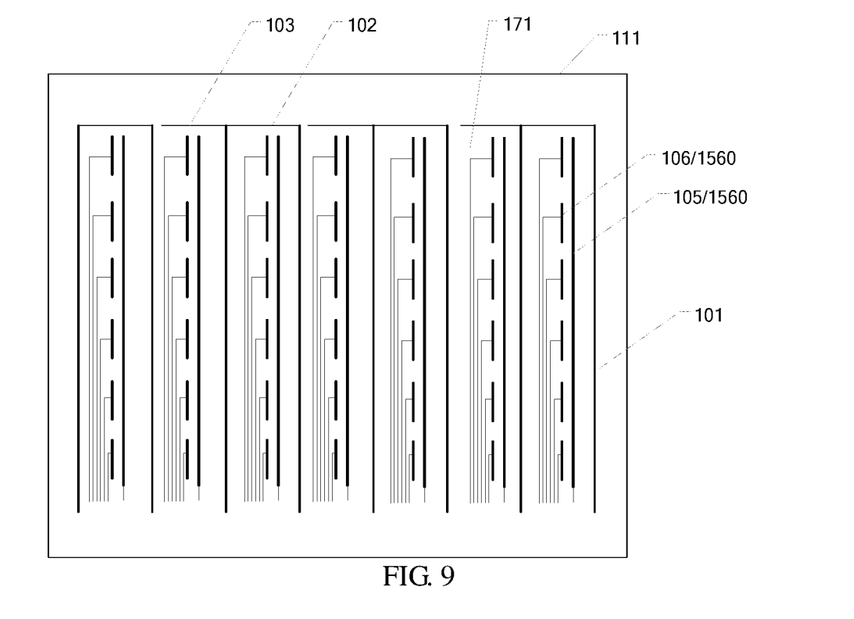
FIG. 9 is a schematic diagram illustrating a force sensor and a touch sensor which are located in the same layer in a touch substrate provided by an embodiment of the present disclosure.

According to the touch substrate provided by an embodiment of the present disclosure, in order to save the process, as illustrated in FIG. 9, the touch sensor 156 and the force sensor 10 can be located in the same layer, and each of the extension parts 101 is located between adjacent touch sensing units 1560. For example, the force sensor and the touch sensor are manufactured on a surface of the base substrate 111, so one base substrate 111 integrates functional layers such as the touch sensor and the force sensor. The base substrate 111, for example, can include a glass substrate. For example, as illustrated in FIG. 9, in a direction perpendicular to the base substrate 111, the force sensing units 100 and the touch sensing units 1560 are not overlapped. For example, the touch sensor 156 can be made from a transparent conductive material, and the force sensor 10 can be made from a transparent conductive material. For example, the transparent conductive material includes but not limited to indium tin oxide (ITO). The force sensor 10 adopts any one of the structure as illustrated in FIGS. 2-6, which is favorable for the arrangement of the touch sensor 156 and the force sensor 10 in the same layer.

The arrangement of the touch sensor 156 and the force sensor 10 in the same layer can save a carrier material (a base substrate) required for the manufacturing of the force sensor, integrate products, allow the products to have higher physical strength, and meanwhile, can reduce the space required by the force sensor, and reduce the thickness of a terminal product.

In a case that the touch sensor 156 and the force sensor 10 are located in the same layer, the extension part 101 of the force sensor is disposed between Tx and Rx; the second detection chip 1042 transmit a driving signal to Tx required by the touch sensor; Rx is responsible for receiving and sending a signal of the touch sensor; and Fx is configured to collect a force signal generated by an action of touch force.

According to the touch substrate provided by an embodiment of the present disclosure, due to adoption of the two-in-one (located in the same layer) design of the force sensor and the touch sensor, the any-pen function can be easily realized, and original handwriting can be realized merely by one common conductive pen. Of course, finger touch can also be adopted.

For example, the wires of the touch sensing units 1560 and the wires 151 of the force sensing units 100 can be located in the same layer with the touch sensor 156 and the force sensor 10.

Figure 10:
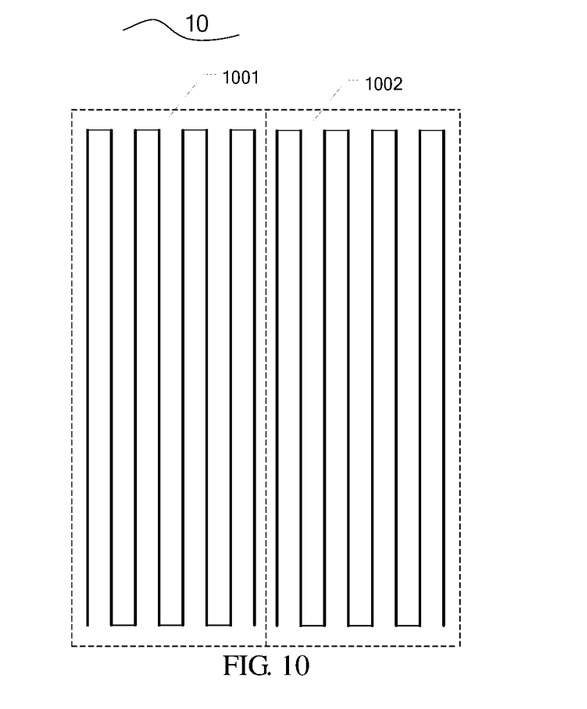
FIG. 10 is a schematic diagram illustrating a plurality of force sensors included in a touch substrate provided by an embodiment of the present disclosure.

According to the touch substrate provided by an embodiment of the present disclosure, as illustrated in FIG. 10, the force sensor 10 includes a plurality of force sensing units 100. Two force sensing units 100 are illustrated in FIG. 10, but the number of the force sensing units 100 can be more. Respective force sensing units 100 can be sequentially located along the same direction. For example, the plurality of force sensing units 100 can be sequentially located along a second direction Y opposite to the extension direction (the first direction X) of the extension parts 101 thereof.

Figure 11A:
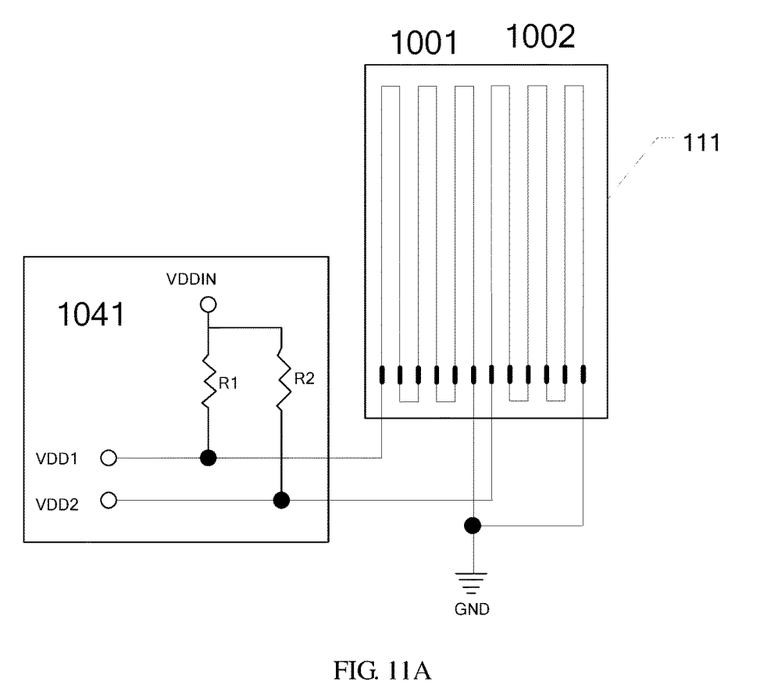
FIG. 11A is a schematic diagram illustrating a plurality of force sensors and a first detection chip which are electrically connected and a detection principle of a touch substrate provided by an embodiment of the present disclosure.

According to the touch substrate provided by an embodiment of the present disclosure, as illustrated in FIG. 11A, the force sensing units are all connected with the first detection chip 1041 by respective wires. For example, both the first force sensing unit 1001 and the second force sensing unit 1002 are connected with the first detection chip 1041 by respective wires.

According to the calculation formula of conductor resistance, R=ρL/s, in which R refers to resistance; ρ refers to an electric resistivity of a conductor; L refers to a length of the conductor; and s refers to a cross-sectional area of the conductor. A touch force causes deformation of the touch substrate, and increase of a length of the force sensing unit 100, resulting in an increase in resistance.

As for a large-size touch substrate, the force sensors can be divided into 2 group or more. The driving voltage (VDDIN) can be reduced at the same time during taking into account the sensitivity (ΔR).

In the case of calculation by adoption of one group, supposing the change in resistance produced by the force sensing unit after being applied by a touch force is ΔR, and before being applied by a touch force, a resistance of the first force sensing unit 1001 is Rf1 and a resistance of the second force sensing unit 1002 is Rf2:

$$\Delta VDD1 = VDDIN \times \left( \frac{Rf1 \mathbin{\square} \Delta R}{R1 \mathbin{\square} Rf1 \mathbin{\square} \Delta R} \mathbin{\square} \frac{Rf1}{R1 \mathbin{\square} Rf1} \right)$$

$$\Delta VDD2 = VDDIN \times \left( \frac{Rf2 \mathbin{\square} \Delta R}{R2 \mathbin{\square} Rf2 \mathbin{\square} \Delta R} \mathbin{\square} \frac{Rf2}{R1 \mathbin{\square} Rf2} \right)$$

Figure 11B:
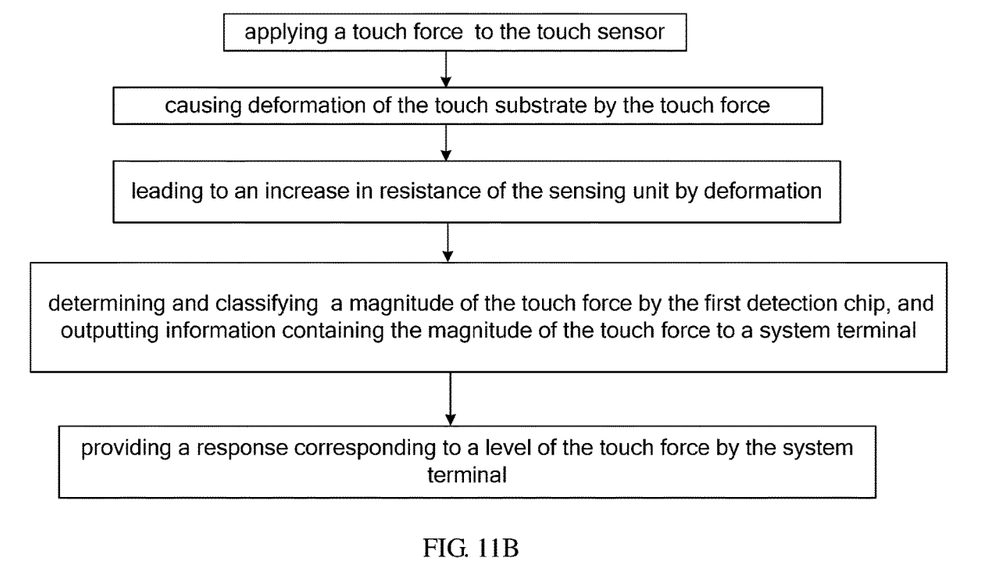
FIG. 11B is a schematic diagram illustrating a touch process of a touch substrate provided by an embodiment of the present disclosure.

According to the touch substrate provided by an embodiment of the present disclosure, as illustrated in FIG. 11B, the touch substrate can be deformed by applying touch force to the touch sensor; the resistance of the touch sensing units is increased due to deformation; the first detection chip determines and classifies a magnitude of a touch force and outputs information containing a magnitude of a touch force to the system terminal; and the system terminal provides a response corresponding to a level of touch force. Thus, the magnitude of the touch force can be detected.

In the embodiment of the present disclosure, description is given by taking the case that one end of the force sensing unit 100 is grounded as an example, the reference voltage can also be in other values, and no limitation will be given herein. Two ends of the force sensing unit 100 can be connected with different pins of the first detection chip 1041 respectively, so as to realize signal transmission. For example, one end and the other end of the line-shaped part of the force sensing unit 100 are connected with different pins of the first detection chip 1041 respectively, so as to obtain the change in voltage difference of the force sensing unit 100 when being pressed by an external force.

Figure 12:
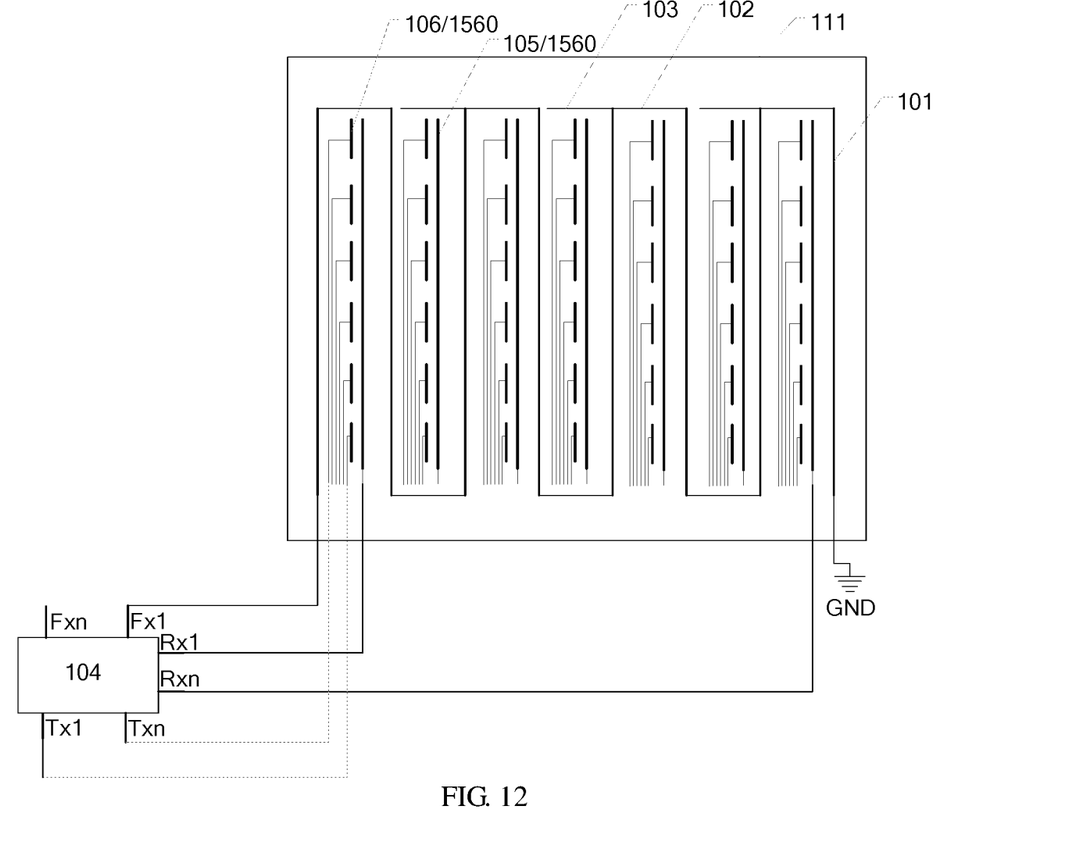
FIG. 12 is a schematic diagram illustrating a force sensor and a touch sensor formed in the same layer and a same detection chip connected with the force sensor and the touch sensor respectively in a touch substrate provided by an embodiment of the present disclosure.

According to the touch substrate provided by an embodiment of the present disclosure, as illustrated in FIG. 12, the first detection chip 1041 and the second detection chip 1042 are an integral structure, and the wires of the plurality of touch sensing units 1560 and the wires of the force sensing units 100 are connected with the same detection chip 104. Thus, the touch product has simpler structure; the product structure and the manufacturing process are significantly simplified; and then the efficiency can be improved. For clarity of illustration, the connecting relationships between the touch sensing units 1560 and the detection chip 104 are not completely illustrated in FIG. 12.

Figure 13:
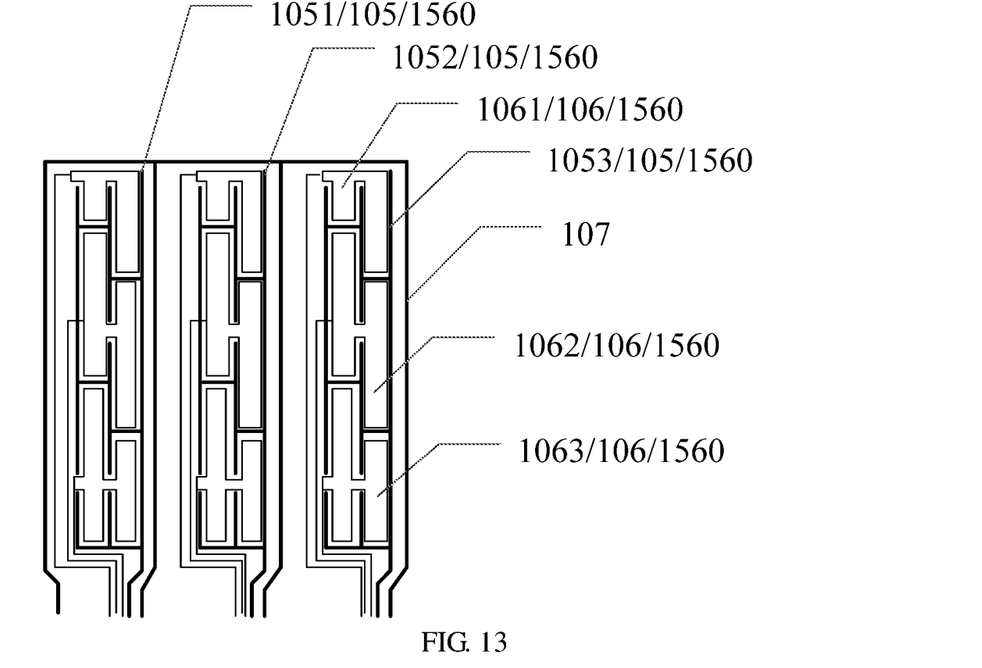
FIG. 13 is a schematic diagram of a touch substrate.

As illustrated in FIG. 13, the touch sensing unit can adopt an abnormal structure, so as to increase the coupling area and be favorable for improving the touch effect. FIG. 13 illustrates a first touch driving unit 1061, a second touch driving unit 1062, a third touch driving unit 1063, a first touch sensing unit 1051, a second touch sensing unit 1052, a third touch sensing unit 1053 and a grounded wire 107.

Figure 14:
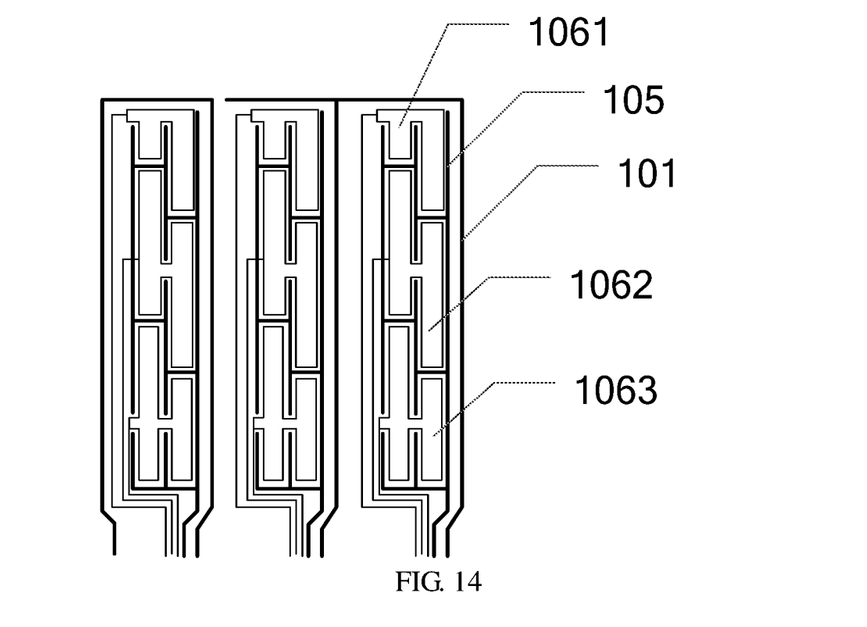
FIG. 14 is a schematic diagram of a touch substrate provided by an embodiment of the present disclosure.

According to the touch substrate provided by an embodiment of the present disclosure, as illustrated in FIG. 14, each of the extension parts 101 is located between adjacent touch sensing units 1560, extending from the first side of the base substrate to the second side, and extending from a side of the base substrate to the other side.

Figure 15:
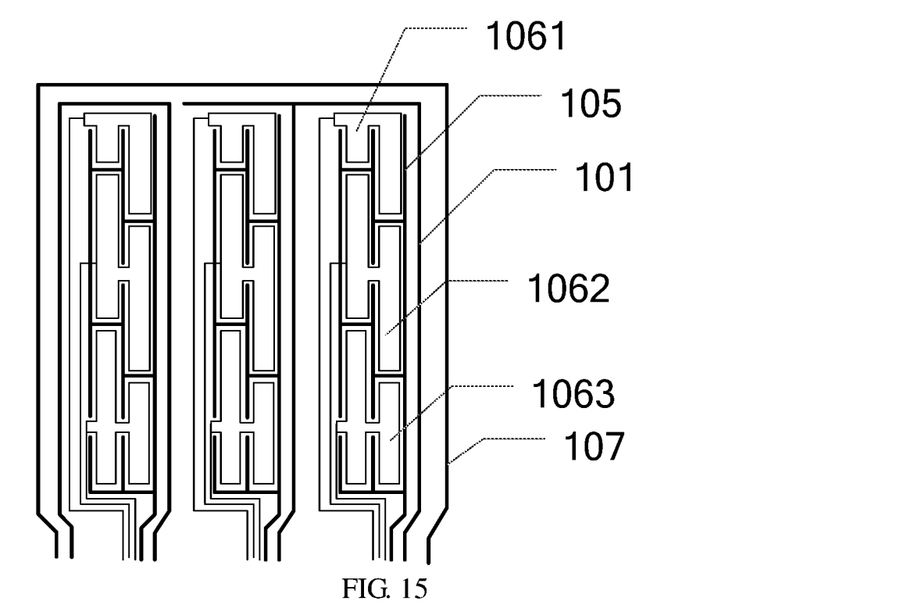
FIG. 15 is a schematic diagram of a touch substrate provided by another embodiment of the present disclosure.

According to the touch substrate provided by an embodiment of the present disclosure, as illustrated in FIG. 15, in order to eliminate static electricity, a grounded wire 107 can be further located on a periphery of the force sensor 10.

As illustrated in FIGS. 14 and 15, a part (connection part) connected with adjacent extension parts 101 can be manufactured by the same process with the touch sensor 156, and can also be formed by an external bonding FPC.

If the force sensing function is not required, the force sensing unit can be converted into GND attribute by an FPC at the bonding end, and the force sensor is directly converted into a common touch sensor without changing a mask of the force sensor, so as to realize the double-duty design of the force sensor.

By adoption of the touch sensor, force signal output can be inconsistent when the same force is adopted to press (touch) different positions of the touch substrate.

Figure 16A:
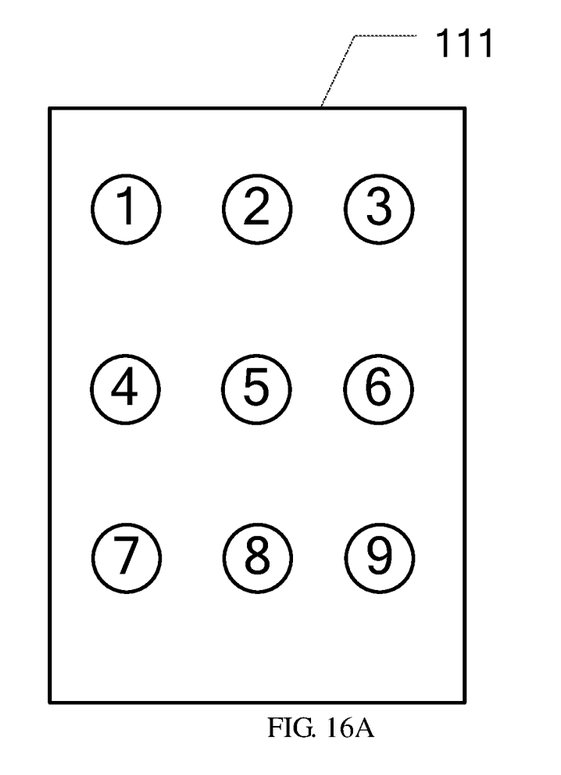
FIG. 16A is a schematic diagram of nine points in a touch substrate provided by an embodiment of the present disclosure.

As illustrated in FIG. 16A, under the condition of a complete device, when the same force is adopted to press a periphery of a screen and a center of the screen, as the deformation quantity caused at different positions is different, the force signal detected by the force sensor may not reflect a magnitude of a touch force accurately. Thus, a mechanism, by which different positions have the same force signal feedback under the same force, is required.

A manipulator is adopted to respectively press the touch substrate by the same force, and force signals detected by the force sensor, when different positions of the screen are pressed (e.g., 9-point test), are recorded to determine the compensation factor of each point. Subsequently, the first detection chip performs position compensation on the force signal in the first detection chip according to actual touch position, and the actual touch position can be detected by the touch sensor 156.

Supposing that the force signals outputted when the above 9 points are pressed by the same force are as illustrated in the following table 1:

TABLE 1

Force Signals Outputted When the Above
9 Points are Pressed by the Same Force

| | Point Position | | | | | | | | |
|---|---|---|---|---|---|---|---|---|---|
| | 1 | 2 | 3 | 4 | 5 | 6 | 7 | 8 | 9 |
| Force Magnitude | 100 | 100 | 100 | 100 | 100 | 100 | 100 | 100 | 100 |
| Force Signal | 50 | 60 | 50 | 60 | 100 | 60 | 50 | 60 | 50 |

And then corresponding compensation factor of a node of each touch sensor 156 in the case of being pressed by a force is estimated.

For example, the flow of the force signal compensation mechanism is as follows:

(1) Finger pressing.

(2) Detecting a touch position by the touch sensor.

(3) Detecting a magnitude of a touch force by the force sensor and outputting a force signal (first force signal).

(4) Making compensation settings on the force signal (the first force signal) by the first detection chip according to the touch position, and outputting an accurate force signal (compensated force signal, corrected force signal, a second force signal).

(5) Outputting a report point and the corrected force value by the system according to a coordinate and the corrected force signal outputted by the first detection chip.

Figure 16B:
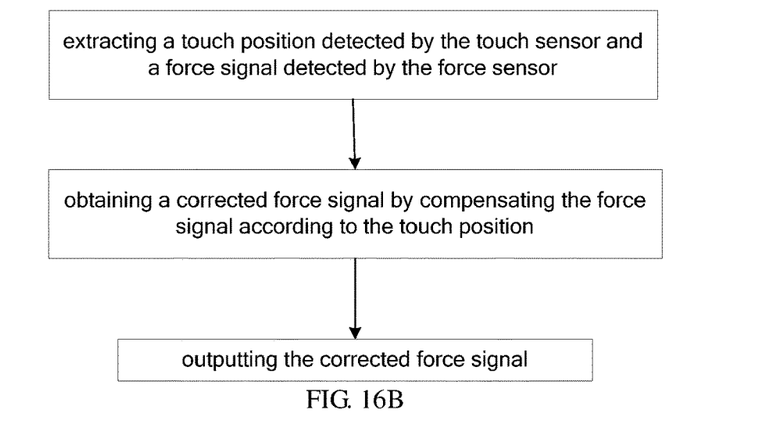
FIG. 16B is a schematic diagram illustrating a force compensation method of a touch substrate provided by an embodiment of the present disclosure.

For example, the touch substrate can include a processor, a memory and a computer program instruction stored in the memory, so as to realize the force signal compensation mechanism. As illustrated in FIG. 16B, the computer program instruction is executed by the processor to perform the following steps:

extracting a touch position detected by the touch sensor and a force signal detected by the force sensor;

obtaining a corrected force signal by compensating the force signal according to the touch position, in which the compensation method includes: compensating the force signal when different positions are pressed, so that same force signal can be outputted when different positions of the force sensor are pressed by the same force; and outputting the corrected force signal.

Figure 17:
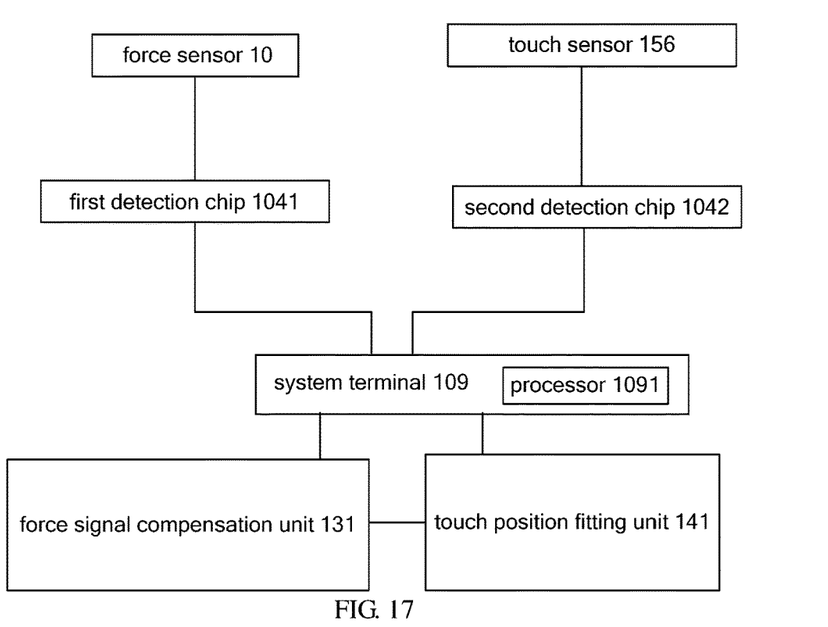
FIG. 17 is a schematic diagram of a touch substrate provided by an embodiment of the present disclosure.

As illustrated in FIG. 17, in order to solve the problem of inconsistent force signal output when different positions are pressed by the same touch force, the touch substrate provided by an embodiment of the present disclosure further includes a force signal compensation unit 131. The force signal compensation unit 131 is configured to compensate the force signal when different positions are pressed, so as to output the same force signal when different positions of the force sensor 10 are pressed by the same touch force.

There is a touch blind area in the case of single-layer touch (as illustrated in FIG. 8 or 9). The touch blind area 171 can be as illustrated in FIG. 8. An actual touch position (may be deviated from an actual coordinate, but within the range allowable by consumer experience) can be obtained by a fitting method according to a change in capacitance value of a capacitor node on the periphery of the touch position. At this point, the magnitude of the touch force at the touch position can also be corrected by the force signal compensation mechanism according to a fitted position (the actual touch position).

When the touch blind area is pressed, an output position of the touch sensor is deviated from an actual position, resulting in inaccurate position output. For example, the output position of the touch sensor is deviated to the left, the right, the upper side or the lower side compared with the actual touch position.

As illustrated in FIG. 17, in order to solve the problem of inaccurate position output caused by the deviation between the output position of the touch sensor and the actual position when the touch blind area is pressed, the touch substrate provided by an embodiment of the present disclosure further includes a touch position fitting unit 141. The touch position fitting unit 141 is configured to obtain an actual touch position by a fitting method according to the touch position outputted by the touch sensor 156 when the touch blind area of a visible area is pressed. For example, on this basis, the force signal compensation unit 131 can also be adopted for compensation. As the actual touch position is obtained, the force signal output can be more accurate.

According to the touch substrate provided by an embodiment of the present disclosure, as illustrated in FIG. 17, the force signal compensation unit 131 and the touch position fitting unit 141 can be respectively connected with a system terminal 109, so as to realize signal transmission. For example, the first detection chip 1041 and the second detection chip 1042 can also be respectively connected with the system terminal 109, so as to realize signal transmission. For example, the system terminal 109 can include a processor 1091.

Of course, in the touch substrate provided by an embodiment of the present disclosure, the force signal compensation unit 131 or the touch position fitting unit 141 can also be not provided. No limitation will be given herein.

At least one embodiment of the present disclosure provides a manufacturing method of a touch substrate, which includes:

forming a force sensor 10 on a base substrate 111, the force sensor 10 including at least one force sensing unit 100, and the force sensing unit 100 including a plurality of extension parts 101 and at least one connection part 102, the plurality of extension parts 101 extending along a first direction X, and the plurality of extension parts 101 being sequentially connected by the at least one connection part 102.

According to the manufacturing method of the touch substrate provided by an embodiment of the present disclosure, the connection parts 102 adjacent to each other in a second direction Y are located on different sides of the base substrate 111 and respectively connected with two ends of the same extension part 101, and the second direction Y is perpendicular to the first direction X.

According to the manufacturing method of the touch substrate provided by an embodiment of the present disclosure, the force sensing unit 100 further includes a protection part 103. The protection part 103 is electrically connected with one of two adjacent connection parts 102 located on the same side of the base substrate 111, and insulated from the other of the two adjacent connection parts 102 located on the same side of the base substrate 111, and the protection part 103 is located on a side of the force sensing unit away from a bonding area 108.

The manufacturing method of the touch substrate provided by an embodiment of the present disclosure further includes forming a touch sensor 156 on the base substrate 111. The touch sensor 156 includes a plurality of touch sensing units 1560. The touch sensor 156 and the force sensor 10 are located in the same layer. Each of the extension parts 101 is located between adjacent touch sensing units 1560.

The manufacturing method of the touch substrate provided by an embodiment of the present disclosure further includes providing a first detection chip 1041 and a second detection chip 1042. The first detection chip 1041 is configured to detect a change in resistance value or a change in voltage value of the force sensor 10, so as to detect a magnitude of a touch force. The second detection chip 1042 is configured to detect a change in capacitance value of the touch sensor 156, so as to detect a touch position.

According to the manufacturing method of the touch substrate provided by an embodiment of the present disclosure, the first detection chip 1041 and the second detection chip 1042 are an integral structure, and wires of the plurality of touch sensing units 1560 and wires of the force sensing unit 100 are connected with the same detection chip 104.

The manufacturing method of the touch substrate provided by an embodiment of the present disclosure further includes providing a force signal compensation unit 131. The force signal compensation unit 131 is configured to compensate a force signal when different positions are pressed, so as to output the same force touch signal when different positions of the force sensor 10 are pressed by the same touch force.

The manufacturing method of the touch substrate provided by an embodiment of the present disclosure further includes providing a touch position fitting unit 141. The touch position fitting unit 141 is configured to obtain an actual touch position by a fit ting method according to the touch position outputted by the touch sensor 156 when a touch blind area of a visible area is pressed.

At least one embodiment of the present disclosure further provides a driving method of the touch substrate, which includes:

providing a driving signal to the force sensor 10; and outputting a force signal according to a change in voltage difference on two ends of the force sensing unit to determine a magnitude of a touch force, the change in voltage difference on two ends of the force sensing unit 100 caused by a change in resistance value of the force sensing unit 100 under an action of an external force.

According to the driving method of the touch substrate provided by an embodiment of the present disclosure, after acquiring the voltage difference change and before outputting the force signal, the driving method further includes compensating the force signal, wherein compensating the force signal comprises: compensating the force signal when different positions are pressed by outputting the same force signal when different positions of the force sensor are pressed by the same touch force.

The driving method of the touch substrate provided by an embodiment of the present disclosure further includes providing a driving signal to the touch sensor 156, determining a touch position by detecting a change in capacitance value of the touch sensor 156.

Before force signal compensation, the driving method of the touch substrate provided by an embodiment of the present disclosure further includes fitting the touch position, the touch substrate further includes a touch sensor which is configured to obtain the touch position; and fitting the touch position includes: obtaining an actual touch position by a fitting method according to the touch position outputted by the touch sensor when a touch blind area of a visible area is pressed.

At least one embodiment of the present disclosure provides a touch display device, which includes any one of the foregoing touch substrates provided by the embodiments of the present disclosure.

For example, the touch display device can be a liquid crystal display (LCD) device and can also be an organic light-emitting diode (OLED) display device. No limitation will be given herein.

The places in the manufacturing method of the touch substrate and the driving method of the touch substrate, provided by the embodiment of the present disclosure, the same with or similar to those in the touch substrate provided by the embodiment of the present disclosure, can refer to each other. No further description will be given herein. In the embodiments of the present disclosure, the force sensing unit in the force sensor can be referred to as force electrode, and the touch sensing unit in the touch sensor can be referred to as touch electrode.

In the embodiment of the present disclosure, "the same layer" refers to the forming of film layers with specific patterns by the same film forming process and the forming of layer structures by one patterning process via the same mask. According to different specific patterns, one patterning process can include multiple exposure, development or etching processes; the specific patterns in the formed layer structures can be continuous and can also be discontinuous; and these specific patterns can also have different heights or have different thicknesses.

Figure 18:
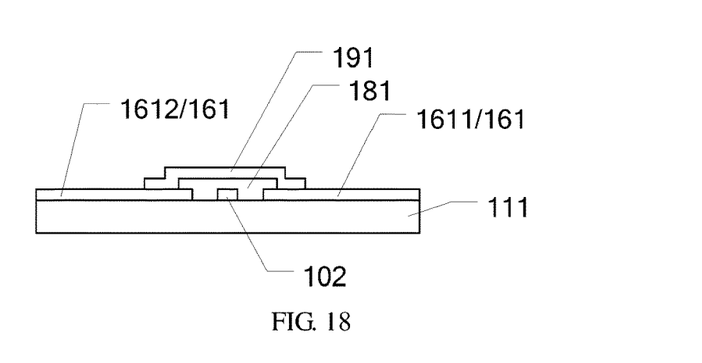
FIG. 18 is a schematic diagram illustrating a design of an overlap position of wires.

In the touch substrate and the manufacturing method thereof, provided by the embodiment of the present disclosure, if different structures formed in the same layer are overlapped, the electrical connection between two structures can be avoided by bridging means. That is to say, one structure is continuously formed in the layer and the other structure is broken at an overlap position, and broken parts are electrically connected with each other by a bridging part on the other layer. For example, as illustrated in FIG. 18, a wire 161 of the touch sensing unit is divided into a first part 1611 and a second part 1612 at an overlap position with the connection part 102; the connection part 102 is insulated from a wire 161 of the touch sensing unit by an insulating layer 181; and the first part 1611 and the second part 1612 are electrically connected with each other by a conductive part 191. The conductive part 191 is made from a conductive material. FIG. 18 is just illustrative description, and the design at the overlap position is not limited to the structure as illustrated in FIG. 18. For example, an overlap position of a wire of a second touch driving unit 1062 and a first touch sensing unit 1051 in FIGS. 13-15 can adopt the structure as illustrated in FIG. 18, so that the wire of the second touch driving unit 1062 can be insulated from the first touch sensing unit 1051.

For example, in the embodiment of the present disclosure, wires located in a display region can be made from a transparent conductive material, and wires located on the outside of the display region can be made from metal or alloy.

The touch substrate and/or touch display device provided by the embodiment of the present disclosure may further include one or more processors and one or more memories. The processor may process data signals and may include various computing architectures, for example, complex instruction set computer (CISC) architecture, reduced instruction set computer (RISC) architecture or one architecture for implementing multiple instruction set combinations. The memory may store instructions and/or data executed by the processor. The instructions and/or data may include codes and are configured to achieve some or all the functions of one or more portions (parts), units, or devices described in the embodiment of the present disclosure. For example, the memory includes a dynamic random access memory (DRAM), a static random access memory (SRAM), a flash memory, an optical memory or other memories known by those skilled in the art.

In some embodiments of the present disclosure, the display device includes codes and programs stored in the memory. The processor may execute the codes and the programs so as to achieve some or all the functions of the portions (parts), units, or devices as described above.

In some embodiments of the present disclosure, a unit such as force signal compensation unit or touch position fitting unit may be a hardware unit which is configured to achieve some or all the functions of the portions (parts), units, or devices as described above. For example, the portions (parts), or units may be a circuit board or a combination of a plurality of circuit boards and is configured to achieve the functions as described above. In the embodiments of the present disclosure, the one circuit board or the combination of the plurality of circuit boards may include: (1) one or more processors; (2) one or more non-transitory computer-readable memories connected with the processors; and (3) processor-executable firmware stored in the memories.

For example, some or all of the functions of one or more units may be implemented in software, hardware, firmware, or any combination thereof.

The following statements should be noted:

(1) Unless otherwise defined, the same reference numeral refers to the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure can be enlarged. However, it should understood that, in the case in which a component or element such as a layer, film, area, substrate or the like is referred to be "on" or "under" another component or element, it can be directly on or under the another component or element or a component or element is interposed there between.

(4) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A touch substrate, comprising:
a base substrate; and
a force sensor, located on the base substrate and comprising at least one force sensing unit, the force sensing unit comprising a plurality of extension parts and at least one connection part, the plurality of extension parts extending along a first direction, the plurality of extension parts being sequentially connected by the at least one connection part,
wherein connection parts adjacent to each other in a second direction are located on different sides of a same surface of the base substrate and respectively connected with two ends of a same extension part, the second direction is perpendicular to the first direction, the force sensing unit further comprises a protection part, the protection part is directly connected with an end of one of two adjacent connection parts on a same side of the base substrate, and spaced apart from the other of the two adjacent connection parts on the same side of the base substrate, and the protection part extends from the end of the one of the two adjacent connection parts toward the other of the two adjacent connection parts.

2. The touch substrate according to claim 1, wherein the force sensing unit comprises a line-shaped part with a shape of a square waveform or a zigzag.

3. The touch substrate according to claim 1, wherein the protection part is located on a side of the force sensing unit away from a bonding area.

4. The touch substrate according to claim 1, further comprising a touch sensor, wherein the touch sensor is located on the base substrate and comprises a plurality of touch sensing units; the touch sensor and the force sensor are located in a same layer; and each of the extension parts is located between adjacent touch sensing units.

5. The touch substrate according to claim 4, further comprising a first detection chip and a second detection chip, wherein the first detection chip is configured to detect a change in a resistance value or a change in a voltage value of the force sensor so as to detect a magnitude of a touch force; and the second detection chip is configured to detect a change in a capacitance value of the touch sensor so as to detect a touch position.

6. The touch substrate according to claim 5, wherein the first detection chip and the second detection chip are an integral structure; and wires of the plurality of touch sensing units and a wire of the force sensing unit are connected with the same detection chip.

7. The touch substrate according to claim 5, further comprising a touch position fitting unit configured to obtain an actual touch position by a fitting method according to the touch position outputted by the touch sensor.

8. The touch substrate according to claim 4, further comprising:
a processor;
a memory; and
a computer program instruction stored in the memory, the computer program instruction being executed by the processor to perform following steps:
extracting a touch position detected by the touch sensor and a force signal detected by the force sensor;
obtaining a corrected force signal by compensating the force signal according to the touch position, so as to compensate the force signal when different positions are pressed, and output a same force signal when different positions of the force sensor are pressed by a same touch force; and
outputting the corrected force signal.

9. A driving method of the touch substrate according to claim 4, comprising:
providing a driving signal to the force sensor; and
outputting a force signal according to a change in voltage difference on two ends of the force sensing unit to determine a magnitude of a touch force, wherein before outputting the force signal, the method further comprises: compensating the force signal, wherein the compensating the force signal comprises: compensating the force signal when different positions are pressed so as to output a same force signal when different positions of the force sensor are pressed by a same touch force.

10. The driving method of the touch substrate according to claim 9, further comprising:
driving the touch sensor to detect a touch position at the same time during driving the force sensor to detect the magnitude of the touch force.

11. The driving method of the touch substrate according to claim 9, further comprising:
driving the force sensor and the touch sensor in a time division manner, wherein the force sensor is grounded when the touch sensor is driven to detect a touch position.

12. A touch display device, comprising the touch substrate according to claim 1.

13. The touch substrate according to claim 1, wherein an opening is provided between the protection part and the other of the two adjacent connection parts on the same side of the base substrate.

14. The touch substrate according to claim 1, further comprising a force signal compensation unit configured to output a same force signal when different positions of the force sensor are pressed by a same touch force.

15. A manufacturing method of a touch substrate, comprising:
forming a force sensor on a base substrate, the force sensor comprising at least one force sensing unit, the force sensing unit comprising a plurality of extension parts and at least one connection part, the plurality of extension parts extending along a first direction, the plurality of extension parts being sequentially connected by the at least one connection part, wherein connection parts adjacent to each other in a second direction are located on different sides of a same surface of the base substrate and respectively connected with two ends of a same extension part, and the second direction is perpendicular to the first direction; and
forming a protection part of the force sensing unit, wherein the protection part is directly connected with an end of one of two adjacent connection parts on a same side of the base substrate, and spaced apart from the other of the two adjacent connection parts on the same side of the base substrate, and the protection part extends from the end one of the two adjacent connection parts toward the other of the two adjacent connection parts.

16. The manufacturing method of the touch substrate according to claim 15, wherein the protection part is located on a side away from a bonding area.

17. The manufacturing method of the touch substrate according to claim 15, further comprising forming a touch sensor at the same time during the forming the force sensor, wherein the touch sensor comprises a plurality of touch sensing units; and each of the extension parts is formed between adjacent touch sensing units.

* * * * *